Patented Oct. 29, 1946

2,410,053

UNITED STATES PATENT OFFICE 2,410,053

ADHESIVE AND ADHESIVE SHEET

Richard Gurley Drew, St. Paul, Minn., assignor to Minnesota Mining & Manufacturing Company, St. Paul, Minn., a corporation of Delaware No Drawing. Application April 7, 1941, Serial No. 387,275

10 Claims. (Cl. 260—3)

This invention relates to a thermo-plastic adhesive material having an elevated softening point at which it becomes tacky or sticky; to adhesive sheet material having a backing coated on one or both sides with a layer of such adhesive, and which may be activated to adhesiveness by application of heat or a solvent; and to an adhesive composition adapted to form an adhesive having such elevated softening point.

The adhesive may be comprised of a thermo-softening rubber-compatible resin combined with the reaction product of rubber and a minor proportion of an oil-soluble heat-advancing phenol-aldehyde type resin, and preferably includes a reinforcing agent or pigment (such as zinc oxide). The reaction need not be complete and further advance may occur upon heating the adhesive at the time of activation, thereby raising the softening point so that softening will not occur upon subsequent subjection to the temperature first used for activation, which feature has an advantage in making heat-resistant splices.

This application is a continuation-in-part of my copending application Serial No. 723,091, filed April 30, 1934.

As suitable examples of thermo-softening rubber-compatible resins, mention is made of rosin, hardened rosins (rosin hardened with zinc oxide, lime, magnesia, etc., to form the corresponding resinate, e. g. zinc abietate, calcium abietate, magnesium abietate, respectively), ester gum, hydrogenated rosin, hydrogenated ester gum, damar, copal, coumarone-indene type resins, hydrogenated indene resin (such as "Nevillite"), dihydronaphthalene resin (such as du Pont "RH–35," which class of resin is described in Industrial and Engineering Chemistry, vol. 32, pages 312–315), as well as mixtures of two or more of such resins. These resins blend with rubber and promote tack.

An example of a suitable rubber-reactive oil-soluble heat-advancing (heat-hardening) phenol-aldehyde resin is "Bakelite No. 3360," sold by the Bakelite Corp., New York. This is a solid resin which is quite friable, resembling rosin in this respect. However, a resin which is liquid or viscous may be used.

These rubber-reactive heat-advancing resins are most commonly formed of para-substituted phenol (such as para tertiary amyl or butyl phenol) reacted with formaldehyde, the latter being substantially in excess of equimolecular amount (preferably 1.5 or more mols formaldehyde per mol of the phenol) with the reaction being performed in the presence of an alkaline catalyst (such as potassium hydroxide), with subsequent neutralization (as with acetic acid). Further details as to this class of resins may be found in U. S. Patents Nos. 1,800,295, 1,800,296, 1,996,069, 2,058,797, 2,079,210, 2,123,898, 2,139,081, 2,101,944, 2,112,022, 2,211,048. These resins are called "oil-soluble" because they are compatible with drying oils such as are used in the varnish art.

The following is given as an example of how such a resin can be made: Place one and one-half mols of formaldehyde (as a 40% solution) in an enameled or glass reacting tank. Add one mol of para tertiary amyl phenol. Then add, dissolved in a small amount of water, potassium hydroxide to the amount of one-half of one percent of the total. Warm this mixture to 60° C. and hold at 60–80° C. until the free formaldehyde is 2% or less. Then add acetic acid to a pH of 4.5–5.5. Evaporate in vacuo to as heavy a body as practical to handle, and run out and cool.

The rubber may be wild rubber, plantation rubber (smoked sheets), latex crepe, reclaimed rubber, scrap rubber, equivalent synthetic or artificial rubber, or combinations thereof.

The reaction between the rubber and phenol-aldehyde resin is preferably performed in the presence of a catalyst to speed the reaction and permit of low temperatures.

Examples of catalysts are metal resinates and naphthenates, such as those of zinc, lead, cobalt and aluminum, and also the oxides of such metals. Thus zinc oxide may be used, though when used in conjunction with a reaction mixture containing rosin (for example) it reacts with the latter to form zinc abietate and this resinate will in such case perform as a catalyst. Dixie clay works as a catalyst, probably because of the aluminum oxide content.

A reinforcing pigment is preferably included to increase the cohesive strength of the adhesive. Zinc oxide, carbon black and Dixie clay, are examples. This material may be multi-functional. For example when zinc oxide is used in conjunction with rosin, part will react with the rosin to form zinc abietate, and the zinc oxide (and/or resinate) also serves in promoting the reaction between the rubber and phenol-aldehyde resin.

A suitable compounding technique is to dry mix or masticate the rubber, thermo-softening resin and reinforcing pigment (when used), using a mixer provided with a heating jacket, then heat to an elevated temperature with addition of the phenol-aldehyde resin (and catalyst if not already present) and continue mixing until the reaction has progressed to the desired extent. The adhesive may subsequently be dissolved in a solvent if desired, such as an aromatic hydrocarbon type. It is thus possible to compound without resort to any special apparatus or technique, since the mixing or mastication of rubber and resin (using heat as an aid) is the common way in which rubber-resin cements are prepared.

If the phenol-aldehyde resin were not employed, the usual sticky, plastic type of rubber-resin cement would result. The reaction of the rubber with the phenol-aldehyde resin firms up the mass, increases the cohesive strength, and results in a reduction of tack. The tack may be reduced substantially completely so as to make possible an adhesive sheet which is normally substantially tack-free and only becomes activated to adhesiveness upon subsequent application of heat or a solvent. In this case the reaction thus results in making the adhesive resistant to heat, up to the elevated temperature which is needed to make it tacky or adhesive, making possible heat-resistant joints and splices, etc. The rubber, and the adhesive as a whole, is also made tougher and more resistant to mineral oils. The reaction also makes the rubber more age-resistant and improves the aging life of the adhesive.

Fairly wide ranges of proportions can be used. The thermo-softening resin should be in sufficient amount to plasticize the rubber and render it tacky or adhesive. Usually 25–150 parts per 100 parts rubber will be found satisfactory. The phenol-aldehyde resin should in general be in minor proportion, less than half the rubber, with 5–30 parts per 100 parts rubber being the most useful range. The effect depends in part upon the extent to which the reaction advances, since a larger proportion with partial completion of the reaction may accomplish no more than a smaller amount where reaction is more complete. The extent of reaction completion depends upon the proportion, temperature and time, for any given catalyst.

The reaction may be followed by the reading of a watt meter measuring the power demand of the motor which drives the mixer. As soon as the reaction starts, the power starts rising and continues rising until the reaction has gone as far as it can at the temperature employed, from which point on the power curve flattens. This permits of close control, since the reaction can be stopped at a desired point.

Only a small amount of catalyst is needed to produce marked results. Thus 1 part by weight of zinc oxide added to a mix comprised of 100 parts latex rubber, 50 parts rosin and 13 parts "Bakelite 3360," sufficed. Reclaimed rubber already contains zinc oxide in sufficient amount so that no additional catalyst need be used.

In making adhesives I have found it generally desirable to include 50–200 parts of zinc oxide per 100 parts rubber, when this is used as a reinforcing pigment. Only a minor proportion reacts with the rosin (when used), the balance acting as a reinforcing pigment. A much smaller proportion of carbon black suffices for equivalent reinforcing.

Various fillers can be added if desired, as well as modifying agents such as softeners or plasticizers. One or more rubber antioxidants may be included.

Example 1

| | Parts |
|---|---|
| Reclaimed rubber | 232 |
| Latex crepe | 46 |
| Zinc oxide | 232 |
| Gum rosin (WW) | 143 |
| Beta-naphthol | 4 |
| Aldol-alpha-naphthylamine (such as "Age-Rite Resin") | 4 |
| "Bakelite No. 3360" | 36 |
| Xylol | 540 |
| Denatured ethyl alcohol | 26 |

The rubber (reclaimed and latex crepe) and zinc oxide are combined on a rubber mill to form a base, and this is then put in an internal mixer (such as a Baker-Perkins type) which has previously been warmed up with 5 lbs. steam pressure (above atmospheric pressure) in the heating jacket.

The rosin is added slowly with mixing to blend it in. The rubber anti-oxidants (beta-naphthol and "Age-Rite Resin") are incorporated.

The steam pressure in the heating jacket is then increased to 80 lbs.—producing a jacket temperature of about 285° F.—with continued mixing. Then the "Bakelite No. 3360" is added and mixed for about 25 minutes, by the end of which time the mass will have reached a temperature of about 285° F. The reaction at this point will not be complete, since if mixing is continued the power consumption of the motor driving the mixer will continue to increase for upwards of 30 minutes longer. However, the extent of completion is sufficient to produce a good heat-activatible adhesive. But, if desired to make an adhesive having a higher softening or activation temperature, mixing may be continued for a longer time.

The steam is turned off and cooling water passed through the heating jacket, with continued mixing. After 10 minutes, or when the mass temperature has been reduced to about 150° F., the solvents (xylol and alcohol) are slowly added with continued mixing until a homogeneous product is formed.

The resulting solution may then be used as a cement. It is well adapted for the coating of cloth or paper, or other sheet material, to form, upon evaporation of the solvent, a substantially non-tacky adhesive coating which may subsequently be activated by using a sealing iron temperature of 400–450° F. Or, if desired, the adhesive mass may be removed from the mixer in its plastic condition, without addition of solvent, and be calendered or frictioned upon a desired backing.

Another procedure is to remove the adhesive mass from the mixer very shortly after the addition of the "Bakelite No. 3360," with or without addition of solvent, and after coating the desired backing therewith, complete the reaction to the desired extent by heating the coated sheet in an oven. In this case, there need be no heating to the reaction temperature in the mixer.

Example 2

| | Parts |
|---|---|
| Reclaimed rubber | 6.25 |
| Zinc oxide | 6.25 |
| Gum rubber (smoked sheets or latex crepe) | 1.40 |
| Rosin (WW gum) | 8.60 |
| Beta-naphthol | 0.11 |
| "Age-Rite Resin" | 0.11 |
| "Bakelite No. 3360" | 0.88 |
| Xylol | 2.25 |
| V. M. P. Naphtha (aromatic coal tar naphtha) | 12.95 |

The same procedure may be used as in the preceding example, if desired.

In both examples the total weight of zinc oxide approximates the total rubber weight (making allowance for the zinc oxide content of the reclaimed rubber), while the "Bakelite No. 3360" approximates 12 parts per 100 parts total rubber. In Example 1, the rosin amounts to about 50 parts per 100 total rubber, while in Example 2 it amounts to about 110 parts per 100 total rubber.

An excellent splicing adhesive sheet or tape can be made by applying the product of either example to one or both sides of a cloth. When double-coated, the resultant adhesive tape or sheet may be used for joining sheet materials together by being placed in between, or for joining a sheet material to a rigid or semi-rigid base. Thus such materials as cloth, paper, leather, wood and metal may be united in various combinations. An open weave cloth may be used so that the adhesive penetrates and impregnates the cloth from both sides, to form what is essentially a layer of adhesive reinforced by the cloth within its body. Paper may be used as a backing or reinforcing, a porous open type being preferable so as to secure good anchorage to the adhesive. Penetration of the paper may be facilitated by breaking down the rubber to a greater extent in the mixer and by performing the reaction with the phenol-aldehyde resin in situ, by heating the coated or impregnated paper in an oven, rather than by reacting in the mixer.

An excellent splicing sheet for abrasive belts can be made by coating a cloth backing (such as jeans cloth) on one side with the adhesive of Example 1. Thus a diagonal butt splice can be made, with a strip of the adhesive sheet being applied thereover to overlap both ends, the adhesive face being applied against the non-abrasive side. A sealing iron is applied against the back of the splicing sheet to force it into good contact and a temperature of 400–450° F. is used to activate the adhesive. An excellent joint can be made in this way, even though the abrasive belt is of the waterproof kind having an oil-resin treated backing. A valuable feature is that the splice will resist the heating encountered in operation of the abrasive belt, and is also resistant to such materials as kerosene with which the belt may be bathed, as when abrading metal.

The adhesive is waterproof and the backing of an adhesive or splicing sheet may be waterproofed to prevent loosening of its bond to its adhesive coating when the latter is on one side only, thus making for a waterproof single-coated splicing sheet. For example, a cloth backing of open weave may be saturated with a diluted solution of the adhesive as it comes from the mixer, so as to coat the threads. Greater penetration can be obtained by deferring the reaction until after impregnation, as heretofore mentioned. A back-sizing may be applied, such as a coating of "Bakelite No. 3360," deposited from a solvent such as xylol. Or a cloth may simply be coated on one side with the adhesive and on the back side with plasticized ethyl cellulose (such as by applying a solution of 100 parts ethyl cellulose and 30 parts castor oil dissolved in denatured ethyl alcohol, followed by drying). Various other waterproofing treatments can of course be used.

Such waterproof splicing sheet or tape may be used for splicing abrasive belts (such as belts of waterproof sandpaper) which are subjected to water when in use.

Splicing tape made in accordance herewith also finds use in splicing webs of paper or other sheet material that are being drawn through treating equipment where there is exposure to elevated temperatures and to petroleum solvents.

The adhesive solution may be applied as a cement for various joining purposes where it is desired to secure a bond which is resistant to elevated temperatures and to water, etc. If it is desired to avoid solvent evaporation from within the joint, the cement may be applied to one or both surfaces to be joined, and after solvent evaporation the coated surfaces are brought together and then heat is applied to activate the adhesive. Thus in laminating a sheet material to a wood base, either or both may be coated with the cement and, after drying, the sheet is applied to the wood and a hot iron is pressed against the back of the sheet to activate the adhesive.

Having described various illustrative embodiments of my invention, but without intent to be limited thereto, what I claim is as follows:

1. An adhesive composition comprised of rubber, a thermo-softening rubber-compatible resin adapted to produce tack, and a minor proportion of an oil-soluble heat-advancing rubber-reactive phenol-aldehyde resin.

2. An adhesive composition comprised of a thermo-softening rubber-compatible resin adapted to produce tack and blended with the reaction product of a mixture of rubber and a minor proportion of an oil-soluble heat-advancing rubber-reactive phenol-aldehyde resin.

3. An adhesive composition according to the preceding claim containing a reinforcing pigment.

4. An adhesive composition comprised of a thermo-softening rubber-compatible resin adapted to produce tack and blended with the reaction product of a mixture of rubber and a minor proportion of a phenol-aldehyde resin, where the latter is of the type made by reacting a para-substituted phenol with formaldehyde in excess over the equimolecular quantity, in the presence of an alkali, and is oil-soluble, heat-advancing and rubber-reactive.

5. An adhesive composition according to the preceding claim wherein for each 100 parts of rubber there are used about 25–150 parts of the thermo-softening resin and about 5–30 parts of the phenol-aldehyde resin.

6. An adhesive sheet comprising a flexible backing coated with a substantially non-tacky heat-activatible adhesive comprised of a thermo-softening rubber-compatible resin adapted to produce tack and blended with the reaction product of a mixture of rubber and a minor prportion of an oil-soluble heat-advancing rubber-reactive phenol-aldehyde resin.

7. An adhesive sheet according to the preceding claim wherein for each 100 parts of rubber there are used about 25–150 parts of the thermo-softening resin and about 5–30 parts of the phenol-aldehyde resin.

8. An adhesive sheet adapted for use as a heat-activatible splicing sheet, comprising a flexible backing coated with a substantially non-tacky heat-activatable adhesive essentially comprised of about 25–150 parts of a thermo-softening rubber-compatible resin adapted to produce tack blended with the reaction product of 100 parts rubber and about 5–30 parts of an oil-soluble heat-advancing rubber-reactive phenol-aldehyde resin, and including a reinforcing pigment.

9. A waterproof adhesive sheet adapted for splicing purposes to form a water and heat-resistant bond, comprising a waterproofed fabric backing coated with a substantally non-tacky heat-activatible adhesive comprised of a thermo-softening rubber-compatible resin adapted to produce tack and blended with the reaction product of a mixture of rubber and a minor proportion of an oil-soluble heat-advancing rubber-reactive phenol-aldehyde resin.

10. An adhesive composition essentially comprised of 100 parts of rubber, 25–150 parts of a thermo-softening resin adapted to produce tack, 5–30 parts of an oil-soluble heat-advancing phenol-aldehyde resin, a catalyst adapted to promote reaction of the rubber and phenol-aldehyde resin upon heating, and a reinforcing pigment.

RICHARD GURLEY DREW.